J. C. Cooke,

Hose Coupling

No. 4,344. Reissued Apr. 18. 1871.

Witnesses.

Phil. P. Barnes.

F. N. Jackson

Inventor.

James C. Cooke,

By Mm. C. Wood

Attorney.

N. PETERS, PHOTO-LITHOGRAPHER, WASHINGTON, D. C.

United States Patent Office.

JAMES C. COOKE, OF BRIDGEPORT, CONNECTICUT, ASSIGNOR TO ALBERT F. ALLEN, OF PROVIDENCE, RHODE ISLAND.

Letters Patent No. 22,166, dated November 30, 1858; reissue No. 4,344, dated April 18, 1871.

IMPROVEMENT IN HOSE-COUPLINGS.

The Schedule referred to in these Letters Patent and making part of the same.

*To all whom it may concern:*

Be it known that I, JAMES C. COOKE, of Bridgeport, in the county of Fairfield and State of Connecticut, have invented a new and improved Hose or Pipe-Coupling; and I do hereby declare that the following specification, taken in connection with the drawing furnished and forming a part of the same, is a true, clear, and exact description thereof.

My invention consists—

First, in so forming the two parts of a coupling that any two parts will come into proper relation with each other and thereby obviate any necessity for changing ends, as is usual with hose-couplings in common use; this I accomplish by providing each half of the coupling with corresponding alternating male and female flanges, or parts that interlock with each other; and Also, in a novel means for more securely holding the hose to the coupling, which consists in providing the hose ends of the coupling and holding-band with a corresponding annular projection and groove, which, when brought into close relation with each other, bear upon the hose when interposed between them, and also, at the same time, cause the interior of the hose, at the point of connection, to be on a line, or nearly so, with the interior of the coupling.

Referring to the drawing—

Figure 1:
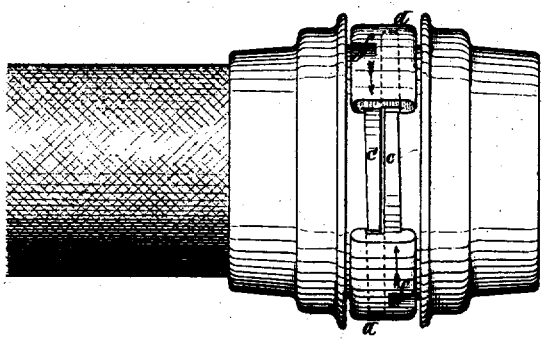
Figure 1 represents a set of my improved couplings with hose attached. The faces are brought together ready for attachment, which is accomplished by turning them in opposite directions, as indicated by the arrows.
Figure 2:
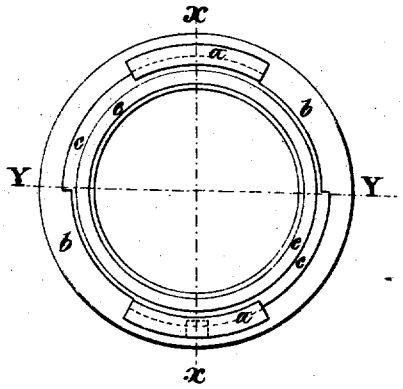
Figure 2 represents, in end view, my improved coupling, the same being the connecting-face.
Figure 3:
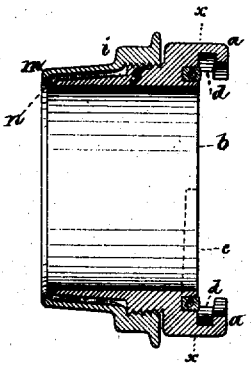
Figure 3 represents the same in longitudinal central section through line *x x*.
Figure 4:
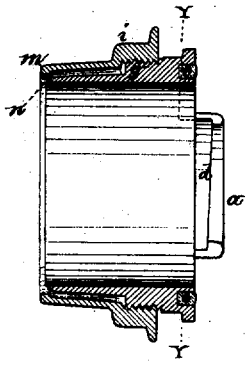
Figure 4 represents the same in longitudinal central section through line *y y*.
Figure 5:
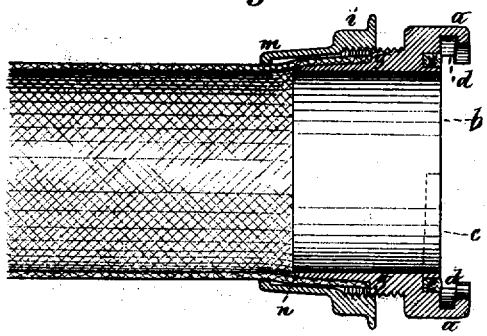
Figure 5 represents the coupling and holding-ring in section, with the hose interposed between. The two parts are represented as connected, but not brought closely together by means of the screw-connection.

The interior of the coupling is straight, or nearly so, and corresponds in size, as far as may be practicable, with the interior of the hose with which it is to be used.

The connecting-face of the coupling is provided with two longitudinally-projecting lips or flanges, *a*, each of which is provided with an annular channel or groove, *d*.

The connecting-face is also provided with two annular projecting flanges, *c*.

These flanges *a* and *c* are placed at opposite points of the periphery of the coupling, and occupy about four-sixths of the circumference, the remaining space being divided in half, forming the two spaces *b*, between the annular projecting flanges *c* and the longitudinally-projecting flanges *a*.

Two pieces like those shown and described constitute a set.

When placed face to face the flanges *a* are made to enter the respective spaces *b*, and, when fully entered, are turned so as to cause the annular flanges *c* to enter the annular grooves *d* in the flanges *a*.

These annular flanges *c* are slightly tapering, being thinnest at the ends adjacent to the spaces *b*, with the taper all upon the inner side, so that, when entered into the grooves *d*, a drawing effect is produced by the contact of the tapering sides with the corresponding sides of the grooves *d*.

The projecting flanges *a* are provided with recesses, *f*, for receiving a hose-wrench. Projecting studs or pins would serve a similar purpose.

The hose end of my coupling has its exterior surface tapered from a thin edge up to a suitable distance, as shown in the drawing at *g*, at which point a shoulder is raised, and a plane annular surface formed, upon which a male-screw thread is cut.

The holding-band *i* has its interior surface tapered, and at an angle corresponding with the exterior surface of the coupling, from its end to *g*. It is also provided with an annular interior plane surface, in which a female screw is cut corresponding with the male screw on the coupling before described.

The holding-rim, at its hose end, is also provided with an annular interior projection, *m*.

The hose end of the coupling is provided with an exterior annular groove or recess, *n*, reversely corresponding in form and general character with the projection *m*.

The hose and coupling are connected as follows:

The holding-band is detached from the coupling and placed upon the hose. The end of the coupling is then inserted into the hose as far as *g*. The holding-band *i* is then drawn up to the coupling, and the screws engaged and turned until the holding-band is drawn into its proper position.

It will be observed that, from the time the holding-band and the coupling are first connected until fully drawn together, the intermediate annular space between the tapering surfaces is gradually lessened, thus compressing the hose between them; and also that the annular projection *m*, when brought into proper relation with the corresponding groove *n*, with the hose interposed, by its peculiar action secures a tight joint, and causes the inner surfaces of the hose and coupling to be, practically, on the same line.

In some cases it may be desirable to introduce the annular elastic packings *e*.

Having thus described my invention,

I claim as new and desire to secure by Letters Patent—

1. The male and female locking devices *a a* and *c c*, attached alternately to the connecting-faces of a hose-coupling, as and for the purposes specified.

2. The corresponding annular projection and recess *m* and *n*, arranged with relation to each other on the holding-band and neck of a hose-coupling, as and for the purposes specified.

JAMES C. COOKE.

Witnesses:
H. T. BLAKE,
WILFRED E. NORTON.